US009716719B2

(12) United States Patent
Liang et al.

(10) Patent No.: US 9,716,719 B2
(45) Date of Patent: Jul. 25, 2017

(54) COMMUNICATION MANAGING METHOD AND COMMUNICATION SYSTEM (71) Applicant: ZTE CORPORATION, Shenzhen, Guangdong Province (CN)

(72) Inventors: Qiandeng Liang, Shenzhen (CN); Jianjie You, Shenzhen (CN); Shuyi Wang, Shenzhen (CN); Huaxing Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/786,990

(22) PCT Filed: Apr. 11, 2014

(86) PCT No.: PCT/CN2014/075159
§ 371 (c)(1),
(2) Date: Oct. 26, 2015

(87) PCT Pub. No.: WO2014/176964
PCT Pub. Date: Nov. 6, 2014

(65) Prior Publication Data
US 2016/0065575 A1    Mar. 3, 2016

(30) Foreign Application Priority Data
Apr. 28, 2013   (CN) .......................... 2013 1 0155598

(51) Int. Cl.
H04L 29/06         (2006.01)
H04W 12/06         (2009.01)
(Continued)

(52) U.S. Cl.
CPC ........ *H04L 63/0892* (2013.01); *H04L 63/105* (2013.01); *H04W 12/06* (2013.01);
(Continued)

(58) Field of Classification Search
CPC .................................................. H04L 63/0892
See application file for complete search history.

(56) References Cited

U.S. PATENT DOCUMENTS 7,680,931 B2 *   3/2010   Nagami .................. H04L 47/10
                                                                709/225
8,732,043 B2 *   5/2014   Shaikh ................... G06Q 30/04
                                                                455/406

(Continued)

FOREIGN PATENT DOCUMENTS

CN      101150519 A      3/2008
CN      102131240 A      7/2011
(Continued)

OTHER PUBLICATIONS

Enhanced 3GPP System for Interworking with Fixed Broadband Access Network; Hyunsook Kim and LaeYoung Kim, CTO Corporate, LG Electronics et al. IEEE Communications Magazine, Mar. 2013.

*Primary Examiner* — Shawnchoy Rahman
(74) *Attorney, Agent, or Firm* — Ling Wu; Stephen Yang; Ling and Yang Intellectual Property (57) ABSTRACT

Disclosed are a communication managing method and a communication system, when an authentication of the user terminal is passed or the user information of the user terminal is changed, an AAA server sends the user information including authorization information of the user terminal to a service control server corresponding to the user terminal, the service control server performs the policy control on the service of the user terminal according to the user information, the realization process is simple and easy to be extended, which improves the processing efficiency and reduces the press of the service control server; meanwhile, in the above-mentioned scheme, the AAA server can send the user formation to the service control server inde-
(Continued)

pendently, and it is not required that the authentication server must exist, thereby it can provide a wider application, provide a more flexible service development way for the operator, and further improve the processing efficiency.

14 Claims, 6 Drawing Sheets

(51) Int. Cl.
  *H04W 4/24* (2009.01)
  *H04W 84/12* (2009.01)
  *H04L 12/14* (2006.01)

(52) U.S. Cl.
  CPC ...... *H04L 12/1407* (2013.01); *H04L 12/1467* (2013.01); *H04L 63/20* (2013.01); *H04W 4/24* (2013.01); *H04W 84/12* (2013.01)

(56) References Cited

U.S. PATENT DOCUMENTS

| | | | |
|---|---|---|---|
| 9,094,264 B2* | 7/2015 | Lin | H04L 29/12216 |
| 9,485,279 B2* | 11/2016 | Kirner | H04L 63/10 |
| 9,521,549 B2* | 12/2016 | Lundstrom | H04W 8/26 |
| 2004/0073928 A1* | 4/2004 | Alakoski | H04L 12/1886 725/62 |
| 2006/0277185 A1* | 12/2006 | Sato | G06F 21/6245 |
| 2009/0054037 A1 | 2/2009 | Kaippallimalil | |

FOREIGN PATENT DOCUMENTS

| | | |
|---|---|---|
| CN | 102893669 A | 1/2013 |
| CN | 103001927 A | 3/2013 |
| WO | 2006118497 A1 | 11/2006 |

* cited by examiner

COMMUNICATION MANAGING METHOD AND COMMUNICATION SYSTEM

TECHNICAL FIELD

The present document relates to the communication field, and in particular, to a communication managing method and a communication system.

BACKGROUND OF THE RELATED ART

As the communications market has become increasingly open, the telecommunication services are rapidly developing towards digitalization, broadbandization, synchronization and personalization, and the competition between the various operators will become more and more intensely. The basic point of the competition is the competition of the access resources, how to provide various required services fast, effectively, flexibly and with low cost for customers becomes the primary problem needing to be considered by the operators firstly. The WLAN access mode meets the operators' needs to a certain extent, and WLAN is an acronym of Wireless LAN, that is, wireless local area network. The wireless Ethernet technique is a wireless transmission based local area network technique, compared to the wired network technique, it has many features such as the flexibility, rapid networking, personalization, etc. This technique is applied to the access network field of the telecommunication network, which can provide the network access to the users conveniently and flexibly, and this technique is appropriate for public places with high user mobility and data service demands, high-end enterprises and home users, occasions needing to build temporary networks, and environments hard to use the wired access mode.

The WLAN system typically consists of an access controller (AC) and an access point (AP). The WLAN system can be divided into two types according to the networking mode: fat AP networking and thin AP networking. The fat AP is that an AP serves as a wireless router, wherein the AP performs the networking independently, which can be used without the access controller (AC). The thin AP is a wireless bridge, which can only be used with AC control, in fact the AC control is an antenna of the AC. In order to reduce the transformation for the WLAN access network in the current network, the access scheme in which the AP is separated from a Broadband Network Gateway (BNG) is usually adopted, in which the BNG device is directly hanged on the AC or hanged next to the AC. In the deployment scenario of the AP separating from the BNG, the AC served as an authentication server is responsible for authentication of an access user and security control of an access channel. The BNG served as a service control point is responsible for statistics of user traffic and online time used for charging and the control of user subscription bandwidth, quality of service and service policy. The network managed by the operator between an authentication point and a service control point is safe and feasible in general, and the network topology is steady, thereby the deployment mode that the authentication point is separated from the service control point is feasible, and the application scenario where the authentication point is separated from the service control point will be more and more. However in the deployment scenario where the authentication point is separated from the service control point, the BNG serves as a Radius Proxy, which needs to modify the BNG greatly, and the BNG serves as a Radius Proxy, which needs to re-unpack, re-pack, and the communication realization process is complicated, with low processing efficiency and is not good for extension.

SUMMARY

The main technical problem to be solved in the present document is to provide a communication managing method and a communication system to address the problems of the complicated communication realization process, low processing efficiency and difficult extension when an existing authentication point is deployed separately from an existing service control point.

In order to solve the above-mentioned technical problem, the present document provides a communication managing method, comprising:

when an authentication of a user terminal is passed or user information of the user terminal is changed, an Authentication Authorization Accounting AAA server sending the user information of the user terminal to a service control server corresponding to the user terminal, wherein the user information comprises authorization information of the user terminal;

the service control server performing policy control on a service of the user terminal according to the user information.

In one embodiment of the present document, the communication managing method further comprises:

when the user terminal is offline, the AAA server sending a user offline instruction to the service control server;

the service control server terminating the policy control on the service of the user terminal after receiving the user offline instruction.

In one embodiment of the present document, the authorization information of the user terminal comprises address information of the user terminal, and/or identification information of the user terminal, and/or service policy information of the user terminal.

In one embodiment of the present document, the service control server performing policy control on a service of the user terminal according to the user information comprises:

the service control server issuing a user forwarding information table of the user terminal to a forwarding plane corresponding to the service control server according to the user information;

wherein the service control server terminating the policy control on the service of the user terminal according to the user information comprises:

the service control server deleting the user forwarding information table of the user terminal in the forwarding plane corresponding to the service control server.

In one embodiment of the present document, the method further comprises: after performing the policy control on the service of the user terminal according to the user information, the service control server sending a charging start instruction to the AAA server; after receiving the user offline instruction, the service control server sending a charging stop instruction.

In one embodiment of the present document, the authentication of the user terminal comprises:

the user terminal completing the authentication with the AAA server through an authentication server;

or the user terminal completing the authentication with the AAA server through an operator.

In one embodiment of the present document, the user terminal completing the authentication with the AAA server through an authentication server comprises:

the authentication server determining an association relationship with the service control server;

the user terminal associating to the authentication server, the authentication server determining a corresponding service control server for the user terminal;

the user terminal completing authentication by interacting with the AAA server through the authentication server; during the authentication, the authentication server sending information of the service control server determined for the user terminal to the AAA server.

In one embodiment of the present document, when the user terminal completes the authentication with the AAA server through the operator, the AAA server obtains information of the service control server corresponding to the user terminal from the operator.

In one embodiment of the present document, the managing method further comprises:

when the authentication server has detected that the user information of the user terminal is changed, the authentication server sending a user information change notification message to the AAA server;

or the AAA server receiving a user information change notification message sent by the operator.

In one embodiment of the present document, the managing method further comprises:

when the authentication server has detected that the user terminal is offline, the authentication server sending a user offline notification message to the AAA server.

To solve the above-mentioned problem, the present document further provides a communication system, the communication system comprises a user terminal, a service control server and an Authentication Authorization Accounting AAA server;

the AAA server is configured to, when an authentication of the user terminal is passed or user information of the user terminal is changed, send the user information of the user terminal to a service control server corresponding to the user terminal, wherein the user information comprises authorization information of the user terminal;

the service control server is configured to perform policy control on a service of the user terminal according to the user information.

In one embodiment of the present document, the AAA server is further configured to, when the user terminal is offline, send a user offline instruction to the service control server;

the service control server is further configured to, after the user offline instruction is received, terminate the policy control on the service of the user terminal.

In one embodiment of the present document, the authorization information of the user terminal comprises address information of the user terminal, and/or identification information of the user terminal, and/or service policy information of the user terminal.

In one embodiment of the present document, the service control server being configured to perform policy control on a service of the user terminal according to the user information comprises:

the service control server issuing a user forwarding information table of the user terminal to a forwarding plane corresponding to the service control server according to the user information;

wherein the service control server terminating the policy control on the service of the user terminal according to the user information comprises:

the service control server deleting the user forwarding information table of the user terminal in the forwarding plane corresponding to the service control server.

In one embodiment of the present document, the service control server is further configured to, after the policy control is performed on the service of the user terminal according to the user information, send a charging start instruction to the AAA server; and after the user offline instruction has been received, send a charging stop instruction to the AAA server.

In one embodiment of the present document, the communication system further comprises an authentication server, and the user terminal is configured to complete the authentication with the AAA server through the authentication server; or the user terminal is configured to complete the authentication with the AAA server through an operator.

In one embodiment of the present document, the user terminal being configured to complete the authentication with the AAA server through the authentication server comprises:

the authentication server determining an association relationship with the service control server;

the user terminal associating to the authentication server, the authentication server determining a corresponding service control server for the user terminal;

the user terminal completing authentication by interacting with the AAA server through the authentication server; during the authentication, the authentication server sending information of the service control server determined for the user terminal to the AAA server.

In one embodiment of the present document, the AAA server is further configured to, when the user terminal completes the authentication with the AAA server through the operator, obtain information of the service control server corresponding to the user terminal from the operator.

In one embodiment of the present document, the authentication server is further configured to, when the authentication server has detected that the user information of the user terminal is changed, send a user information change notification message to the AAA server;

the AAA server is further configured to receive the user information change notification message sent by the authentication server or receive a user information change notification message sent by the operator.

In one embodiment of the present document, the authentication server is further configured to, when the authentication server has detected that the user is offline, send a user offline notification message to the AAA server.

The beneficial efforts of the embodiments of the present document are as follows:

In the communication managing method and communication system provided by the embodiments of the present document, when the authorization of the user terminal is passed or the user information of the user terminal is changed, the AAA server sends the user information including the authorization information of the user terminal to the service control server corresponding to the user terminal, the service control server performs the policy control on the service of the user terminal according to the user information, in the process of using the service control server provided by the embodiment of the present document to perform the policy control on the service of the terminal, the service control server is not required to serve as a proxy device of the AAA server to re-unpack and re-pack the authentication message of the user terminal, and the realization process is simple and easy to be extended, which improves the processing efficiency and reduces the press of the service control server; meanwhile, in the above-mentioned scheme provided by the embodiment of the present document, the AAA server can send the user formation to the service control server independently, and it is not required that the authentication server must exist, thereby it can provide a wider application and provide a more flexible service development way for the operator, and can further improve the processing efficiency.

PREFERRED EMBODIMENTS OF THE INVENTION

In the embodiments of the present document, when the authentication of the user terminal is passed or the user information of the user terminal is changed, the AAA server sends the user information including the authorization information of user terminal to the service control server (i.e. a service control point) corresponding to the user terminal, the service control server performs the policy control on the service of the user terminal according to the user information, in this process, the service control server is not required to serve as a proxy device of the AAA server to re-unpack, re-pack the authentication message of the user terminal, and the realization process is simple and easy to be extended, which improves the processing efficiency and reduces the press of the service control server; meanwhile, in the present document, the AAA server can send the user formation to the service control server independently, thereby it can provide a wider application and provide a more flexible service development way to for the operator, and can further improve the processing efficiency.

Hereinafter in conjunction with the specific embodiments, the present document will be further described in detail.

Embodiment One

Figure 1:
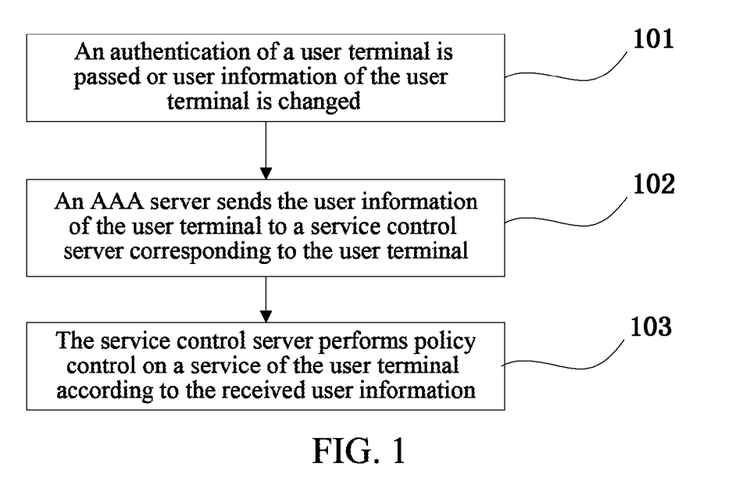
FIG. 1 is a schematic diagram one of a flow of a communication method in the embodiment one of the present document.

Firstly, the English abbreviations related to the embodiment are illustrated below:
WLAN, Wireless Local Area Network,
AC, Access Controller,
AP, Access Point
BNG, Broadband Network Gateway,
AAA, Authentication Authorization Accounting,
VLAN, Virtual Local Area Network
CAPWAP, Control And Provisioning of Wireless Access Points Protocol
SDN, Software Defined Network
NMS, Network Management System
DM, Disconnect Message
CoA, Change-of-Authorization Message
EAP, Extensible Authentication Protocol
ACL, Access Control List
CAR, Committed Access Rate
VRF, Virtual Routing Forwarding
MAC, Medium Access Control
IP, Internet Protocol
NAS, Network Access Server
PMK, Pairwise Master Key
DHCP, Dynamic Host Configuration Protocol As shown in FIG. 1, a communication method in the embodiment comprises the following steps.

In step 101, an authentication of a user terminal is passed or user information of the user terminal is changed;

In the embodiment, the authentication of the user terminal can be that the user terminal automatically completes the authentication interaction with the AAA server, and the authentication of the user terminal also can be completed manually, and in the embodiment, user information change of the user terminal can be sent by the authentication server (i.e. an authentication point) to the AAA server, and also can be sent by the related operator to the AAA server, the subsequent contents of the embodiment will be described with respect to the above-mentioned various cases.

In the embodiment, when the authentication of the user terminal is completed manually, the authentication server is not needed to participate, and that is, the authentication server is not required to exist in the embodiment to realize the authentication of the user terminal, thereby it can provide a wider application and provide a more flexible service development way for the operator, for example, by using the scheme provided by the embodiment, the user can open a prepaid network permission by telephone without Internet authentication, and the user experience satisfaction also can be provided.

In step 102, the AAA server sends the user information of the user terminal to a service control server corresponding to the user terminal;

In the embodiment, the user information comprises authorization information of the user terminal, and the authentication information of the user terminal comprises address information of a user terminal (e.g. MAC address, IP address, etc.), and/or identification information of a user terminal (e.g. unique identification information of the user terminal), and/or service policy information of a user terminal (e.g. VRF, etc.);

In the embodiment, the AAA server can dynamically issues the user information to the service control server corresponding to the user terminal, the user information issuing does not depend on whether the information of the user terminal exists in the service control server.

In the embodiment, the AAA server can obtain the information of the service control server corresponding to the user terminal in the process of the user terminal completing the authentication with the AAA server; and the AAA server also can directly obtain the information of the service control server corresponding to the user terminal through the operator, the obtainment of the information of the service control server will be described in subsequent parts of the embodiment;

In step 103, the service control server performs policy control on a service of the user terminal according to the received user information.

In the embodiment, the service control server performing policy control on a service of the user terminal comprises, the service control server issuing a user forwarding information table such as a user information, a routing table, etc., corresponding to the user terminal to the forwarding plane of the service control server according to the user information, it is should be understood that, in addition to selecting the BNG device as the service control server in the embodiment, and any other communication devices with the functions described above can also be selected, which will not be described repeatedly here.

After the service control server performs policy control on a service of the user terminal according to the received user information, the embodiment further comprises that the service control server sends a charging start instruction to the AAA server to notify the AAA server to start charging.

Figure 2:
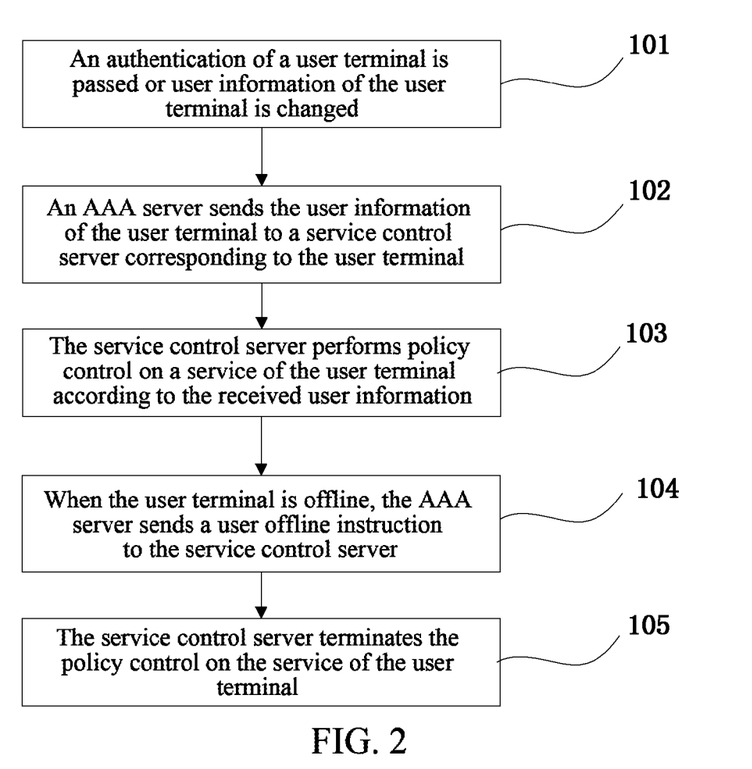
FIG. 2 is a schematic diagram two of a flow of the communication method in the embodiment one of the present document.

As shown in FIG. 2, after the above step 103 is completed, the embodiment further comprises the following steps.

In step 104, when the user terminal is offline, the AAA server sends a user offline instruction to the service control server;

The AAA server can judges whether the user terminal is offline according to the policy of the service of the user terminal, and can receives the related information sent by the authentication server to judge whether the user terminal is offline; for example, the user terminal completes the authentication with the AAA server through the authentication server (at this time the authentication server serves as an AAA client), when the user terminal is offline, if the server authentication server first senses that the user terminal is offline, in order to avoid that the usage of the charging stop message affects the existing service flow, the authentication server sends the user offline notification message to the server to notify that the user is offline, in order to ensure the reliability, the authentication server can set a mandatory requirement that the message notification needs to be replied, of course, in actual application, the reply for the message notification may be not needed according to the specific application scenario; after the AAA server has received the user offline notification message and known that the user is offline, it can judge that the user terminal is offline, then cancels the service policy of the user terminal, and sends an DM message to send the user offline instruction to the service control server; in the embodiment, before the specified user is required to be deleted, it allows to prompt the user to renew at a certain time or flow margin, so as to update the user lease on the server. For the access user in the scenario that the authentication server is separated from the service control point, the server allows the service control point to continue to report the charging stop message to complete the normal user charging.

In step 105, the service control server terminates the policy control on the service of the user terminal after receiving the user offline instruction; specifically, the service control server can delete the user forwarding information table of the forwarding plane corresponding to the user terminal; at this point, the service control server can also send the charging stop message to the server.

Based on the above analysis, it is known that, in the embodiment, there are at least two ways for the user terminal to complete the authentication with the AAA server, the two ways will be described below, respectively.

Figure 3:
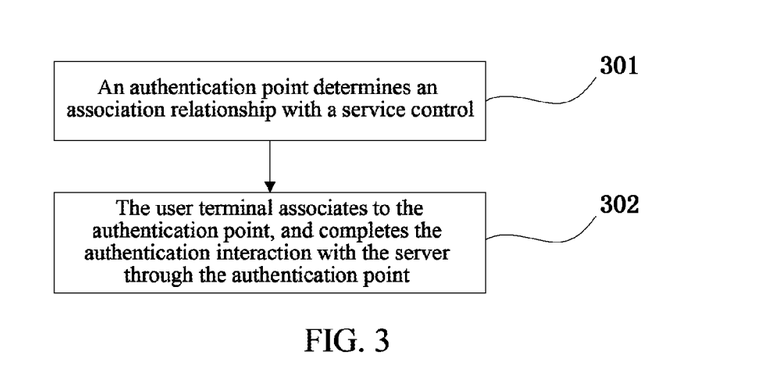
FIG. 3 is a schematic diagram of a flow of a user terminal completing authentication with a server in FIG. 4.

When the user terminal automatically completes authentication interaction with the AAA server, as show in FIG. 3, this process comprises the following steps.

In step 301, an authentication server determines an association relationship with a service control server;

This step can be realized through configuration (local command configuration or NMS remote configuration). For example, when an AC serves as the authentication server, a BNG device (i.e. service control server) which directly corresponds to the AC can be configured on the AC, when an AP serves as the authentication server, the AC can issue information of the BNG device to the AP via a CAPWAP control message. In principle, it is required that the service of one authentication server only can associate with one valid service control server (i.e. service control point) and has a corresponding relationship on the link, the relationship from the service control server to the authentication server is a point-to-multipoint relationship, the relationship from the authentication server to service control server is a point-to-point relationship. The embodiments allows for isolation according to the domain (the VLAN isolation is embodied on two layers, the wireless side fully isolates the user terminal or the logical authentication server example by the ESSID mapping the VLAN, and the wired side fully isolates the user terminal or the logical authentication server example through the VLAN configured by the L2 network, i.e. the access link from the ESS to the service control point), one authentication server is virtualized as multiple logical authentication server examples, thereby the association of one physical authentication sever and multiple physical service control points is realized.

In step 302, the user terminal associates to the authentication server, and completes the authentication interaction with the server through the authentication server; in this process the authentication server serves as an AAA client of the AAA server, after the user terminal associates to the authentication server, the authentication server determines a corresponding service control server for the user terminal, in the authentication interaction process, the authentication server sends the information of the service control server determined for the user terminal to the AAA server. After the user terminal passes the authentication of the authentication server, the authentication server can further allocate an IP address to the user terminal, and the IP address is sent to the AAA server through the authentication server.

In the above-mentioned process, the information of the service control server can comprise address information and/or Identification information, etc., of the service control server. In the embodiment, the service policy of the user terminal can be or cannot be the explicit process data, as long as the actual action of adding the user information (the fundamental feature is that it comprises the complete user terminal authorization data, which equals to authorization data included in an authentication pass message, which can make the service control server generate a user forwarding information table and perform the functions such as the forwarding and service control, etc.) can be generated; then the AAA server can dynamically issue the user information to the service control server which associates with the AAA server indirectly through the authentication server, the embodiment can adopt the AAA protocol and use the dedicated message type to bear the authorization information which realizes the function, which is different from the authentication receiving message and the dynamic authorization message of the existing AAA protocol. The user information message dynamically issued carries the address information of the user terminal and the various authorization information related to the user terminal, etc. After receiving the user information, the service control server can generate the user table of the user terminal, even the forwarding information tables such as the routing table, etc., to realize the policy control for the service of the user terminal finally, for example, the control for the services such as Internet access permissions of the user terminal, and the service control server can further perform the traffic charging and service control (e.g. ACL, CAR, etc.) on the downlink and uplink of the user terminal.

Under the scenario shown in FIG. 3, when the information of the user terminal is changed, the authentication server can directly send the user information change notification message to the AAA server; specifically, the change information is carried in the charging update message to send to the server or the user information changes can be notified by extending the AAA protocol and using the dedicated information notification message; after receiving the user information change notification message, the AAA server can generate corresponding updated information and send it to the service control server, specifically, the corresponding updated information can be sent via the COA message for the service control server to change the corresponding authorization message.

When the authentication of the user terminal with the AAA server is completed manually, and that is, the above-mentioned authentication server is not embodied on the network, at this point, there is no user information on the service control server, the user can directly notify the operator to open the corresponding service permissions: for example, the user can notify the operator to open the Internet access permission through communication modes such as telephone, and can inform information of the user terminal such as an MAC address, IP address and opening time, etc; after receiving a user notification, the operator can query out the information of the service control server corresponding to the IP address of the user terminal to send the information of the service control server to the server, the server sends the related user information to the service control server corresponding to the user terminal according to that information. At this point, when the information of the user terminal is changed, the AAA server can also obtain the user information change notification message through the operator to generate corresponding updated user information and send to the service control server, specifically, the corresponding updated information can be sent via the COA message for the service control server to change the corresponding authorization message.

In the embodiment, in various exception scenarios, the user information on the authentication server, the user information on service control server and the user information on server are required to keep consistent, of course, the authentication server is not embodied on the broadband network, the user information on the service control point and the user information on the server are finally required to be consistent.

Under the scenario supporting WALAN roam, the server may receive a deceptive notification for the authenticated user, thereby circuit information bound on the service control server is modified. That problem in the embodiment can be solved by means of adding session key (e.g. PMK) into the authorization message sent from the server to the authentication server, at this point, after the user roams, the charging stop message carrying circuit update is required to use a key signature, thus preventing the above-mentioned deceptive case from occurring.

In the embodiment, the mechanism of dynamically issuing the user information between the server and the service control server further comprises the features as follows: the server and the service control server can ensure upgrading and supporting this mechanism smoothly on basis of the existing protocol by whether a switch control server and the service control server need to open this mechanism of dynamically issuing the user information. Moreover, the user information attribute in the user information message which is dynamically issued from the server to the service control server can be extended according to the actual requirements. In the embodiment, the extended AAA protocol is applicable to the AAA protocols such as Radius, Diameter, TACPLUS, etc.

It can be seen that, the scheme provided by the embodiment makes full use of the control plane recourses of the front-end access device, and under the scenario that separation of the authentication server of the user and the service control point is allowed in the current WLAN network, it reduces the service press of the service control point, improves the reaction speed of the WLAN access network supporting the roam and key agreement functions, reduces the delay and roam switching time interval, and can be served as the scheme of issuing to the user independently according to the policy configured by the AAA server to provide a more flexible service development way and user service refined control means. For a better understanding of the present document, the present document will be described in details below respectively in combination of several application scenarios; in various embodiments below, the embodiments will be described by taking, that the control for Internet access permission of a user terminal is realized, the service server is referred to as a service control point, and a authentication server is referred to as a authentication point, as examples; and the various embodiments will be described below, as an example, using the Radius protocol as the AAA protocol.

Embodiment Two

In the embodiment, the 802.1X client access+EPA authentication of a user is realized, in the scenario of an AC separating from a BNG, when the user is online, an AAA server dynamically issues user information to the BNG; when the user is offline, the AAA server notifies the BNG that the user is offline.

Figure 4:
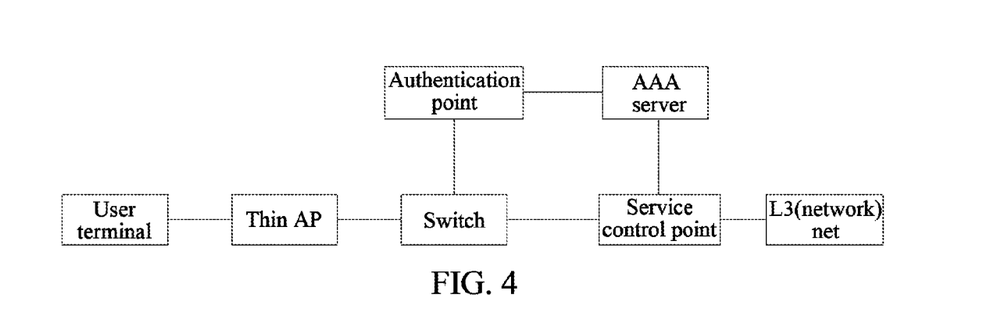
FIG. 4 is a schematic diagram of a network topological structure in the embodiment two of the present document.
Figure 5:
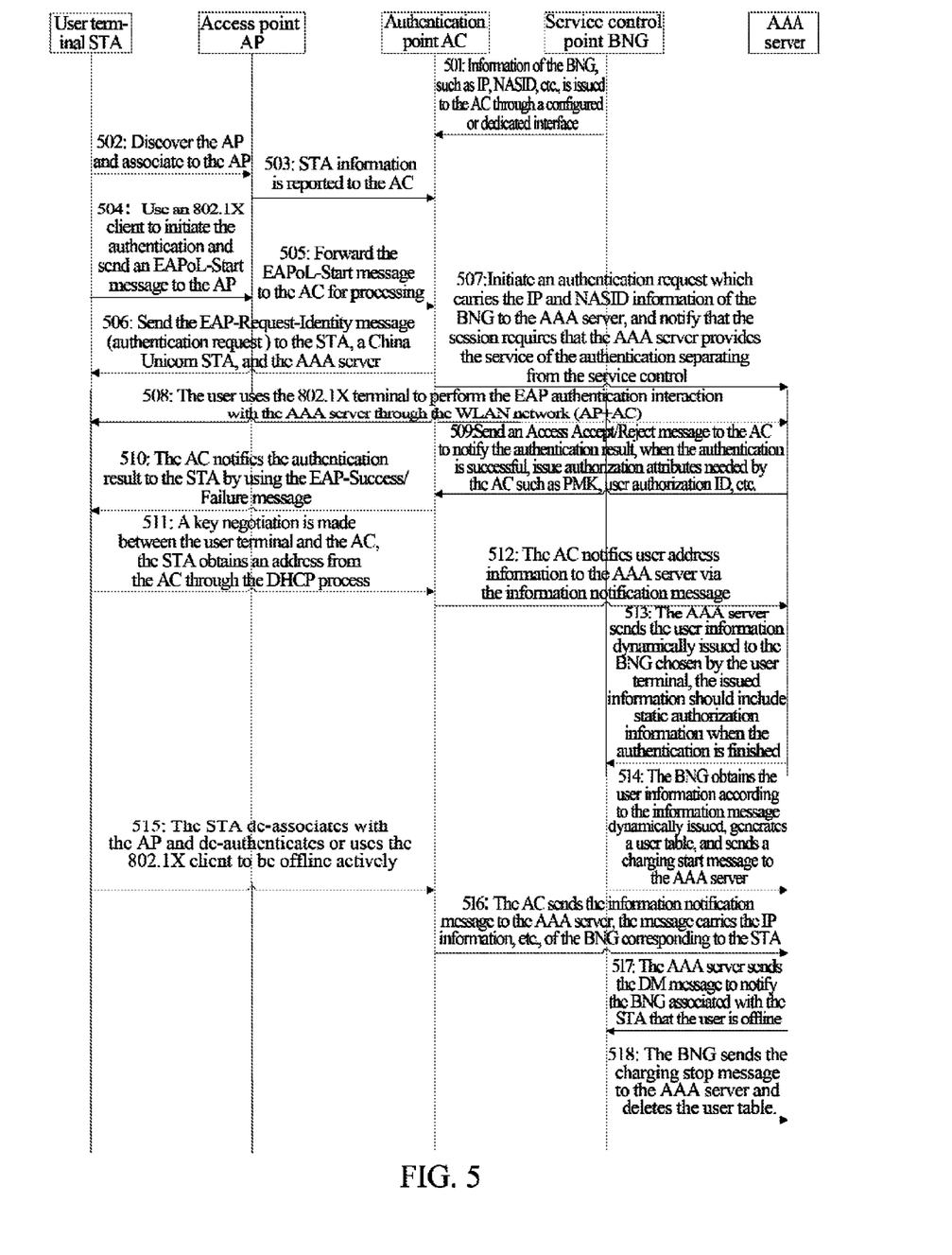
FIG. 5 is a schematic diagram of a flow of a communication method in the embodiment two of the present document.

As shown in FIG. 4, FIG. 4 is a schematic diagram of network topological structure in the embodiment, which comprises a user terminal STA, a thin AP, a switch SW, an authentication server AC, an AAA server, a service control point BNG and an L3net; based on the network topological structure shown in FIG. 4, referring to FIG. 5, as shown in FIG. 5, the steps for realizing the above-mentioned communication process are as follows.

In step 501, information of the BNG, such as IP, NASID, etc., is issued to the AC through a configured or dedicated interface;

In step 502, the user terminal discovers the AP and associates to the AP;

In step 503, the AP reports information of the user terminal to the AC;

In step 504, the user uses an 802.1X terminal to initiate the authentication, and sends an EAPoL-Start message to the AP;

In step 505, the AP forwards the EAPoL-Start message to the authentication server AC;

In step 506, the AC sends the EAP-Request-Identity (authentication request) message to the user terminal, a China Unicom user terminal, and the AAA server;

In step 507, the AC sends the authentication request message which carries the IP and NASID of the BNG to the AAA server, and notifies that the session requires that the AAA server provides the service of an authentication server separating from the service control;

In step 508, the user uses the 802.1X terminal to perform the EAP authentication interaction with the AAA server through the WLAN network (i.e. AP+AC);

In step 509, the AAA server sends an authentication result message to the AC, when the authentication is successful, authorization attributes needed by the AC such as PMK, user authorization ID, etc., are issued;

In step 510, the AC notifies the authentication result to the user terminal by using the EAP-Success/Failure message;

In step 511, a key negotiation is made between the user terminal and the AC (or AP), the user terminal obtains an address from the authentication server through the DHCP process, the address can be indirectly obtained from the BNG (for example, the AC serves as a DHCP proxy).

In step 512, the AC notifies user address information to the AAA server via the information notification message;

In step 513, the AAA server issues the user information to the BNG chosen by the user terminal (i.e. the BNG corresponding to the user terminal) via dynamically issuing information message, the issued information should include static authorization information when the authentication is finished.

In step 514, the BNG obtains the user information according to the information message dynamically issued, generates a user table, and sends a charging start message to the AAA server;

In step 515, the user terminal de-associates with the AP and de-authenticates or uses the 802.1X client to be offline actively;

In step 516, the AC sends the information notification message to the AAA server to notify that the user is offline, the message carries the information of the BNG (e.g. IP, NASID, etc.) corresponding to the user.

In step 517, the AAA server sends the DM message to notify the BNG associated with the user that the user is offline;

In step 518, the BNG sends the charging stop message to the AAA server and deletes the user table.

Embodiment Three

Figure 6:
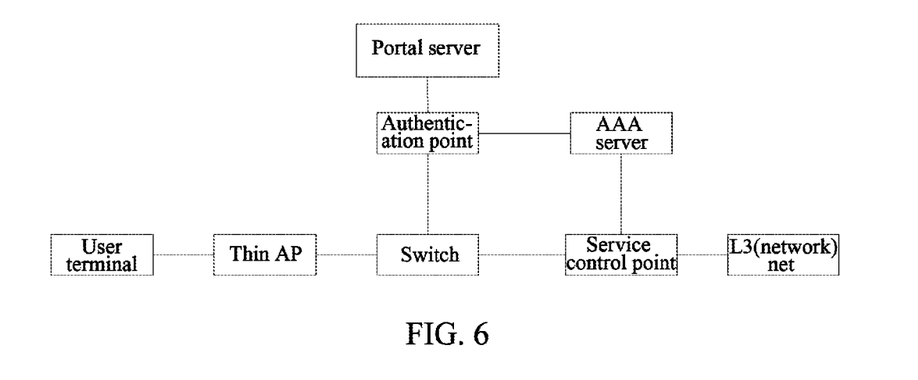
FIG. 6 is a schematic diagram of a network topological structure in the embodiment three of the present document.
Figure 7:
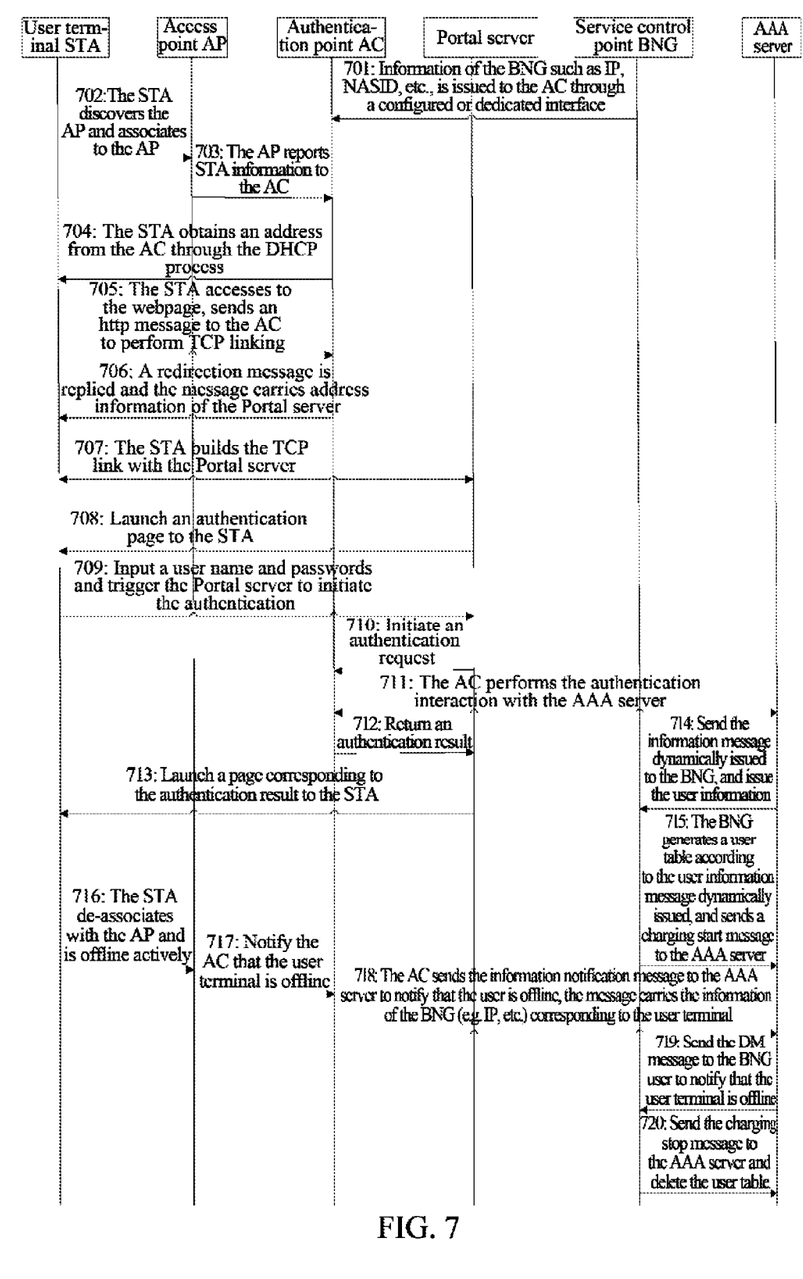
FIG. 7 is a schematic diagram of a flow of a communication method in the embodiment three of the present document.

In the embodiment, based on the network topological structure shown in FIG. 6, the DHCP access+EPA authentication of a user terminal is realized, under the scenario of an AC separating from a BNG, when the Web authentication of the user terminal is successful, an AAA server dynamically issues user information to the BNG; when the user is offline, the AAA server notifies the BNG that the user is offline. As shown in FIG. 7, the communication process comprises the following steps.

In step 701, information of IP, NASID of the BNG is issued to the AC through a configured or dedicated interface;

In step 702, the user terminal discovers the AP and associates to the AP;

In step 703, the AP reports information of the user terminal to the AC;

In step 704, the user terminal obtains an address from the authentication server AC through the DHCP process, the address can be indirectly obtained from the BNG (for example, the AC serves as a DHCP proxy).

In step 705, an STA accesses to the webpage, sends an http message to the AC to perform TCP linking;

In step 706, the AC issues a Web user table; after receiving the http message of the user, the AC replies with a redirection message and directs to a Web server where a portal server is located;

In step 707, the user terminal builds HTTP interaction with the portal server;

In step 708, the portal server launches an authentication page to the user;

In step 709, after inputting a user name and passwords, the user initiates the authentication to the portal server;

In step 710, the portal server initiates an authentication request to the AC;

In step 711, the AC performs the authentication interaction with the AAA server, the AC sends the authentication request which carries the IP and NASID of the BNG to the AAA server, and notifies that the session requires that the AAA server provides the service of an authentication server separating from the service control;

In step 712, the AC feeds back an authentication result to the portal server;

In step 713, the portal server launches a page corresponding to the authentication result to the user;

In step 714, after the authentication is successful, the AAA server dynamically issues the information message to the BNG chosen by the user terminal, the information message comprises the user information;

In step 715, the BNG obtains the user information according to the information message dynamically issued, generates a user table, and sends a charging start message to the AAA server;

In step 716, the user terminal de-associates with the AP and is offline actively;

In step 717, the AP notifies the AC that the user terminal is offline;

In step 718, the AC sends the information notification message to the AAA server to notify that the user is offline, the message carries the information of the BNG (e.g. IP, etc.) corresponding to the user terminal;

In step 719, the AAA server sends the DM message to the BNG user associated with the user terminal to notify that the user terminal is offline;

In step 720, the BNG sends the charging stop message to the AAA server and deletes the user table.

Embodiment Four

Figure 8:
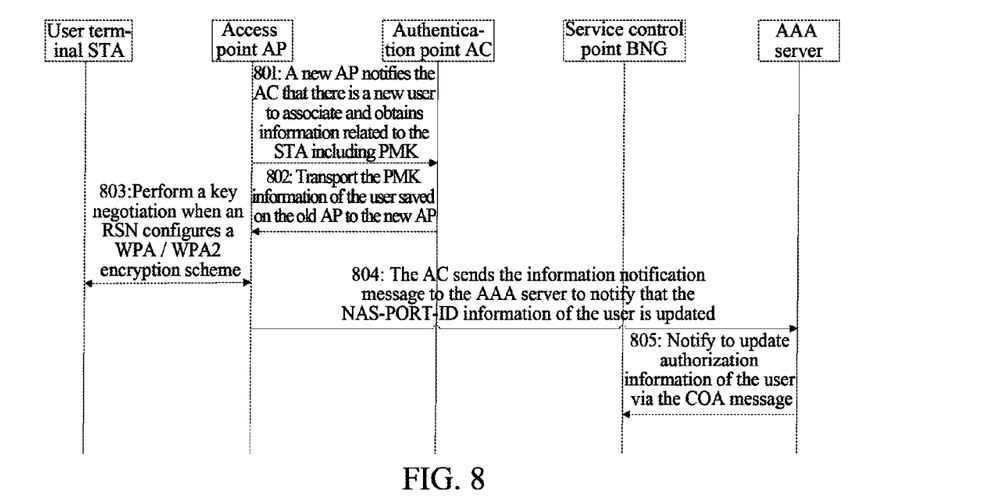
FIG. 8 is a schematic diagram of a flow of realizing user terminal roam handover in the embodiment four of the present document.

The topology networking diagram in the embodiment is same with that in FIG. 4 in the embodiment two, in the case that user information already exists on a BNG, a user terminal roams in the ESS, and NAS-PORT-ID information of the user terminal is changed, at this point, a user authorization information updating process is shown in FIG. 8, which comprises that:

In step 801, a new AP notifies an AC that there is a new user to associate and obtains information related to a user, including PMK;

In step 802, in the embodiment, to further improve the reliability, the AC participates in transport of the PMK, and transports the PMK of the user saved on the old AP to the new AP;

In step 803, the new AP performs a key negotiation with the SAT in the case that an RSN configures a WPA/WPA2 encryption scheme;

In step 804, the AC notifies the AAA server that the NAS-PORT-ID of the user is updated via the information notification message;

In step 805, the AAA server sends the COA message to the BNG to update authorization information of the user terminal.

Embodiment Five

Figure 9:
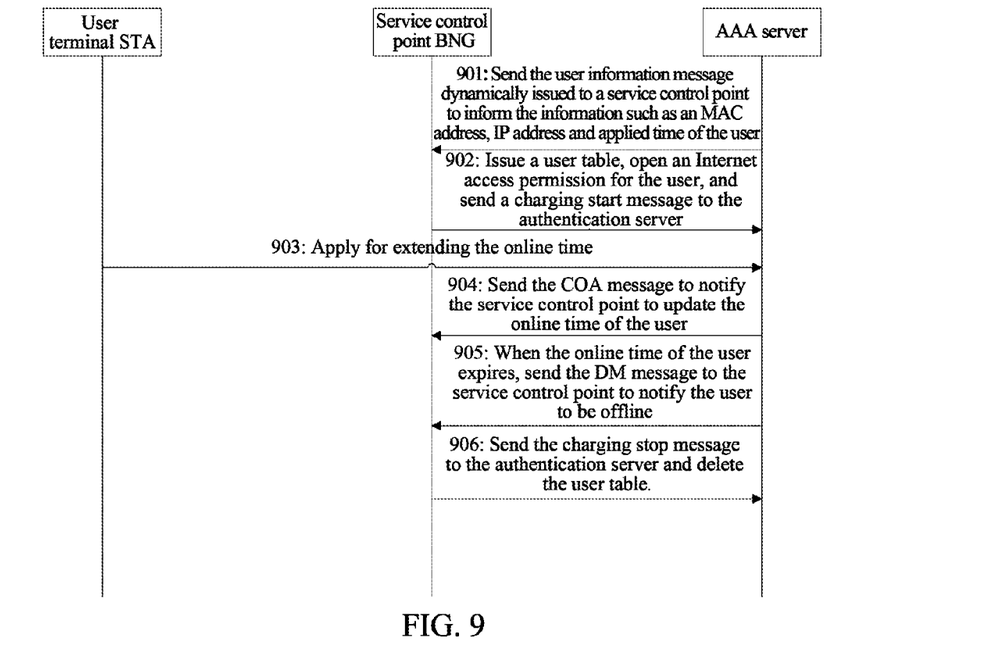
FIG. 9 is a schematic diagram of a flow of a communication method in the embodiment five of the present document.

In the embodiment, in the scenario where a user terminal does not perform the authentication and there is no user information on a BNG, the user can directly notifies the operator to open the Internet access permission and deduct expenses from the account balance. The embodiment is applicable to wireless access and wired access scenarios where the BNG and AAA server are connected, here, taking the wired access as example, the user can notify the operator to open the Internet access permission by telephone, and inform information of the user terminal such as an MAC address, IP address and opening time, etc., after the operator has received the user notification, the operator queries out information of the connected BNG corresponding to the IP of the user terminal and sends it to the AAA server, at this point, as shown in FIG. 9, the subsequent process comprises that:

In step 901, the AAA server issues the user information to the corresponding BNG by dynamically issuing the information message;

In step 902, the BNG issues the user table according to the received information message dynamically issued, opens an Internet access permission for the user, and sends a charging start message to the AAA server to start charging;

In step 903, the AAA server has received a request that the user applies for extending the online time;

In this step, if the application time expires, the user does not apply for extending the online time again, the AAA server will send the DM message to the BNG to notify the user to be offline;

In step 904, the AAA server will send the COA message to the BNG to notify to update the online time of the user;

In step 905, the online time of the user expires, the AAA server sends the DM message to the service control point to notify the user to be offline;

In step 906, the BNG sends the charging stop message to the AAA server and deletes the user table.

The present document is described in further detail with reference to specific embodiments in the above description, but the specific implementation of the present document cannot be considered to be only limited to these descriptions. For an ordinary skilled in the art, various simple deduction or replacements may also be made without departing from the concept of the present document, which should be considered as belonging to the protection scope of the present document.

INDUSTRIAL APPLICABILITY

It can be seen that, the scheme provided by the embodiment of the present document can better solve the problem of user management under the scenario of the authentication server separating from the service control server; it reduces the service press of the service control server; and improves the reaction speed of the WLAN access network supporting the roam and key agreement functions, reduces the delay and roam switching time interval, and is simple to be realized, easy to be extended. Meanwhile, the present document further adopts an information notification mechanism, the AAA server can sense the changes of the user information in real time, which has the strong flexibility; and the present document is compliant with all application scenarios of the current Radius protocol.

What is claimed is:

1. A communication managing method, comprising:

when an authentication of a user terminal is passed or user information of the user terminal is changed, an Authentication Authorization Accounting AAA server sending the user information of the user terminal to a service control server corresponding to the user terminal, wherein the user information comprises authorization information of the user terminal;

the service control server performing policy control on a service of the user terminal according to the user information; wherein the authentication of the user terminal comprises:

the user terminal completing the authentication with the AAA server through an authentication server;

or the user terminal completing the authentication with the AAA server through an operator; wherein the user terminal completing the authentication with the AAA server through an authentication server comprises:

the authentication server determining an association relationship with the service control server;

the user terminal associating to the authentication server, the authentication server determining a corresponding service control server for the user terminal;

the user terminal completing authentication by interacting with the AAA server through the authentication server; during the authentication, the authentication server sending information of the service control server determined for the user terminal to the AAA server;

wherein the communication managing method further comprises:

when the user terminal is offline, the AAA server sending a user offline instruction to the service control server;

the service control server terminating the policy control on the service of the user terminal after receiving the user offline instruction.

2. The communication managing method according to claim 1, wherein the authorization information of the user terminal comprises address information and/or identification information and/or service policy information of the user terminal.

3. The communication managing method according to claim 1, wherein the service control server performing policy control on a service of the user terminal according to the user information comprises:

the service control server issuing a user forwarding information table of the user terminal to a forwarding plane corresponding to the service control server according to the user information;

wherein the service control server terminating the policy control on the service of the user terminal according to the user information comprises:

the service control server deleting the user forwarding information table of the user terminal in the forwarding plane corresponding to the service control server.

4. The communication managing method according to claim 1, wherein the method further comprises: after performing the policy control on the service of the user terminal according to the user information, the service control server sending a charging start instruction to the AAA server; after receiving the user offline instruction, the service control server sending a charging stop instruction.

5. The communication managing method according to claim 1, wherein when the user terminal completes the authentication with the AAA server through the operator, the AAA server obtains information of the service control server corresponding to the user terminal from the operator.

6. The communication managing method according to claim 1, wherein the managing method further comprises:
when the authentication server has detected that the user information of the user terminal is changed, the authentication server sending a user information change notification message to the AAA server;
or the AAA server receiving a user information change notification message sent by the operator.

7. The communication managing method according to claim 1, wherein the managing method further comprises:
when the authentication server has detected that the user terminal is offline, the authentication server sending a user offline notification message to the AAA server.

8. A communication system, wherein the communication system comprises a user terminal, a service control server and an Authentication Authorization Accounting AAA server;
the AAA server is configured to, when an authentication of the user terminal is passed or user information of the user terminal is changed, send the user information of the user terminal to a service control server corresponding to the user terminal, wherein the user information comprises authorization information of the user terminal;
the service control server is configured to perform policy control on a service of the user terminal according to the user information; wherein
the communication system further comprises an authentication server, the user terminal is configured to complete the authentication with the AAA server through the authentication server; or the user terminal is configured to complete the authentication with the AAA server through an operator;
wherein user terminal comprising a hardware processor and a non-transitory computer readable medium with processor executable instructions and being configured to complete the authentication with the AAA server through the authentication server comprises:
the authentication server determining an association relationship with the service control server;
the user terminal associating to the authentication server, the authentication server determining a corresponding service control server for the user terminal;
the user terminal completing authentication by interacting with the AAA server through the authentication server; during the authentication, the authentication server sending information of the service control server determined for the user terminal to the AAA server;
the AAA server is further configured to, when the user terminal is offline, send a user offline instruction to the service control server;
the service control server is further configured to, after the user offline instruction is received, terminate the policy control on the service of the user terminal.

9. The communication system according to claim 8, wherein the authorization information of the user terminal comprises address information and/or identification information and/or service policy information of the user terminal.

10. The communication system according to claim 8, wherein the service control server being configured to perform policy control on a service of the user terminal according to the user information comprises:
the service control server issuing a user forwarding information table of the user terminal to a forwarding plane corresponding to the service control server according to the user information;
wherein the service control server terminating the policy control on the service of the user terminal according to the user information comprises:
the service control server deleting the user forwarding information table of the user terminal in the forwarding plane corresponding to the service control server.

11. The communication system according to claim 8, wherein the service control server is further configured to, after the policy control is performed on the service of the user terminal according to the user information, send a charging start instruction to the AAA server; and after the user offline instruction has been received, send a charging stop instruction to the AAA server.

12. The communication system according to claim 8, wherein the AAA server is further configured to, when the user terminal completes the authentication with the AAA server through the operator, obtain information of the service control server corresponding to the user terminal from the operator.

13. The communication system according to claim 8, wherein the communication system is configured as that, the authentication server is further configured to, when the authentication server has detected that the user information of the user terminal is changed, send a user information change notification message to the AAA server;
the AAA server is further configured to receive the user information change notification message sent by the authentication server or receive a user information change notification message sent by the operator.

14. The communication system according to claim 8, wherein the authentication server is configured to, when the authentication server has detected that the user is offline, send a user information change notification message to the AAA server.

* * * * *